Dec. 1, 1931. A. WELIKES 1,834,883
ANTISHIMMY SPRING
Filed May 28, 1928
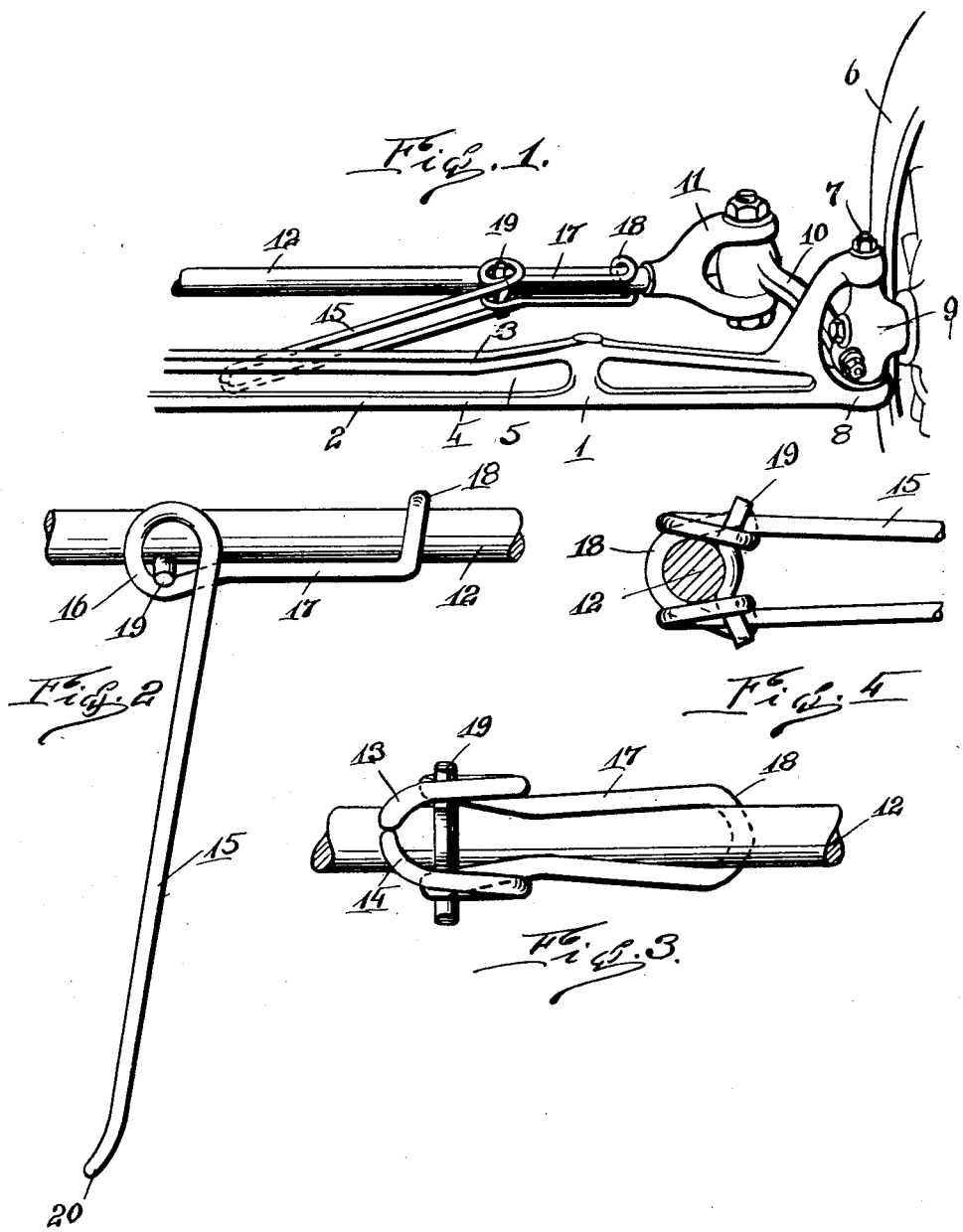
Inventor
Anthony Welikes
By Frank Keifer
Attorney Patented Dec. 1, 1931

1,834,883

UNITED STATES PATENT OFFICE

ANTHONY WELIKES, OF ROCHESTER, NEW YORK

ANTISHIMMY SPRING

Application filed May 28, 1928. Serial No. 281,015.

The object of this invention is to provide a new and improved device to stop the shimmy or wobble of the front wheels of an automobile, by holding the tie rod steady without interfering with the operation of the steering mechanism.

Another object of the invention is to provide a spring that engages three sides of the tie rod, which spring is locked in place on the tie rod after engagement therewith by the insertion of a pin that engages the fourth side of the tie rod.

These and other objects of my invention will be illustrated in the drawings, described in the specification and pointed out in the claims at the end thereof.

In the drawings:

Figure 1 is a perspective view of the front axle of the car with a portion of the steering mechanism and one of the front wheels in place thereon.

Figure 2 is a top plan view of the tie rod with my improved spring attached thereto.

Figure 3 is a front elevation of the tie rod with the spring in place thereon.

Figure 4 is a side elevation of the spring in place on the tie rod, the tie rod being shown in section and the spring being partly broken away.

In the drawings like reference numerals indicate like parts.

In the drawings reference numeral 1 indicates the front axle of an automobile which axle at 2 has the shape of an I beam with flanges 3 and 4 and a web 5 between them. The wheel 6 is pivoted at 7 to the forked end 8 of the axle with a spindle 9. To this spindle is connected an arm 10 which is pivoted on the forked end 11 of the tie rod 12. After a car has been run many thousand miles lost motion accumulates in the bearings between the tie rod and spindles and the front wheels and the bearings by which they are connected. This permits the front wheels to shimmy or wobble.

To prevent this shimmy I have invented a spring which forms the subject matter of this application. This spring is bent of a single piece of spring wire having open ends at 13 and 14. The spring is bent in one piece as a double spring the two sides of which are symmetrical. Each side of the spring is bent with a long arm 15, a loop 16, a short arm 17 and a V shaped yoke 18 by which the two sides of the spring are joined together. The long arms and the yoke are bent at an angle to the short arms. The yoke 18 is placed around the rear side of the tie rod 12, and the loop 16 bears against the front side of the tie rod 12 through the pin 19. The pin 19 being interposed between the loop 16 and the forward side of the tie rod to give the loops of the spring a bearing on the tie rod. The pin 19 is curved with reentrant or reverse bends as shown in Figure 4 so as to give it a seat on the tie rod and to give seats onto the two loops of the spring. The front wheels also shimmy or wobble in new cars in which no lost motion has appeared in the bearings. Shimmy occurs much more in cars equipped with the so-called balloon tires using low pressure than with the high pressure tires with straight sides.

It will be seen that when the spring is in the position shown in the figures and the pin is omitted, the spring itself engages three sides of the tie rod, and is not held in place but when the pin is inserted, the pin engages the fourth side of the tie rod and also engages the spring and the spring is thereby locked in place on the tie rod.

With the parts in position as shown in Figure 2, the arm 15 is sprung to the left as shown in Figure 1 so that the ends 20 will engage against the web 5 in the channel shaped recess of the axle. In this position the spring is under a tension and moves with the tie rod 12 with the ends 20 sliding along the front axle with sufficient friction to prevent the tie rod and the wheels from wobbling, but without interfering with the free and easy movement of the wheels in steering. Either one or two of these springs can be used between the tie rod and the front axle of the car.

I claim:

1. In a lost motion take-up device for automobiles, a resilient member formed from a single length of wire bent upon itself to provide a tie-rod engaging yoke and arms extending from said yoke, said arms each including a short section adapted to be disposed longitudinally of the tie-rod, a relatively long section adapted to extend from said rod and having its free end adapted for sliding engagement with the front axle of the automobile, a tie-rod engaging loop connecting the long and short section of each arm for engagement with the tie-rod, the long sections of the arms being disposed upon the outside of the short sections, whereby when said sections are moved relatively the loops will be forced relatively inward to grip the rod, and a pin engageable with the loops and adapted to be disposed transversely of the tie-rod to engage said rod upon the side opposite the yoke.

2. In a lost motion take-up device for automobiles, a resilient member formed from a single length of wire bent upon itself to provide a tie-rod engaging yoke and arms extending from said yoke, said arms each including a short section adapted to be disposed longitudinally of the tie-rod, a relatively long section adapted to extend from said rod and having its free end adapted for sliding engagement with the front axle of the automobile, a tie-rod engaging loop connecting the long and short section of each arm for engagement with the tie-rod, the long sections of the arms being disposed upon the outside of the short sections, whereby when said sections are moved relatively the loops will be forced relatively inward to grip the rod, a pin engageable with the loops and adapted to be disposed transversely of the tie-rod to engage said rod upon the side opposite the yoke, said pin being centrally curved and having oppositely disposed relatively inclined extremities to provide a central rod receiving portion and spaced loop receiving seats at opposite ends of said rod receiving portion.

In testimony whereof I affix my signature.

ANTHONY WELIKES.